US009131106B2

(12) United States Patent
Mai et al.

(10) Patent No.: US 9,131,106 B2
(45) Date of Patent: Sep. 8, 2015

(54) OBSCURING A CAMERA LENS TO TERMINATE VIDEO OUTPUT

(71) Applicant: Cisco Technology, Inc., San Jose, CA (US)

(72) Inventors: Lan Betty Ngoc Mai, Seattle, WA (US); Joshua Pacheco Rose, Seattle, WA (US)

(73) Assignee: Cisco Technology, Inc., San Jose, CA (US)

( * ) Notice: Subject to any disclaimer, the term of this patent is extended or adjusted under 35 U.S.C. 154(b) by 147 days.

(21) Appl. No.: 13/934,515

(22) Filed: Jul. 3, 2013

(65) Prior Publication Data

US 2015/0009282 A1    Jan. 8, 2015

(51) Int. Cl.
  *H04N 7/14* (2006.01)
  *H04N 1/00* (2006.01)
  *H04N 9/73* (2006.01)

(52) U.S. Cl.
  CPC ........... *H04N 7/147* (2013.01); *H04N 1/00328* (2013.01); *H04N 9/735* (2013.01)

(58) Field of Classification Search
  CPC ... H04N 5/343; H04N 5/3591; H04N 5/3728; H04N 7/147; H04N 9/735; H04N 1/00326; H04N 5/2259; H04N 1/00328

USPC ......... 348/187, 208.11, 240.1, 240.3, 333.08, 348/335, 366
See application file for complete search history.

(56) References Cited

U.S. PATENT DOCUMENTS

| 7,983,524 B2 * | 7/2011 | Honobe ........................ 386/228 |
| 2003/0095798 A1 * | 5/2003 | Sakamoto ........................ 396/85 |
| 2005/0068423 A1 * | 3/2005 | Bear et al. ................ 348/207.99 |
| 2012/0008923 A1 * | 1/2012 | Kasai ............................. 386/343 |
| 2013/0229508 A1 * | 9/2013 | Li et al. ........................... 348/77 |

OTHER PUBLICATIONS

Ludwig, Sean, "Cube26's 'natural vision control' lets you mute video by placing a finger to your lips," VentureBeat, Jan. 9, 2013, pp. 1-3.

* cited by examiner

*Primary Examiner* — Hung Lam
(74) *Attorney, Agent, or Firm* — Edell, Shapiro & Finnan, LLC

(57) ABSTRACT

Techniques are presented herein to terminate output of video captured by a video camera. Detection is made whether a camera lens of a video camera has been obscured by an intentional act of a person. Video output of the video camera is terminated in response to detecting that the camera lens has been obscured. These techniques allow a user to quickly and easily terminate output of video without the need for a dedicated switch or button, or some other special procedure.

18 Claims, 6 Drawing Sheets

LENS OBSTRUCTED-
TERMINATE VIDEO OUTPUT

NORMAL USAGE

LENS OBSTRUCTED-
TERMINATE VIDEO OUTPUT

OBSCURING A CAMERA LENS TO TERMINATE VIDEO OUTPUT

TECHNICAL FIELD

The present disclosure relates to video output control of video-enabled devices.

BACKGROUND

An increasing number of user devices are both audio and video-enabled. These devices allow a user to participate in a phone call, online meeting or conference session, while providing video as well as audio output to other users. Such meetings are often referred to as "video calls." Video calls have an appeal because they can be held without the associated travel inconveniences and costs of in-person meetings. In addition, video calls can provide a sense of community to participants who are dispersed geographically.

Mobile phone and other portable devices are increasingly being utilized in video calls. A problem arises with video calls made on portable devices with limited battery capacity. Video calls can dramatically increase data usage and processing requirements as compared to traditional phone calls, thus consuming more of the power supplied by the battery of a portable device. Additionally, network data usage fees may increase substantially due to video calls. Further still, a user may simply wish not to be seen on a video call.

DESCRIPTION OF EXAMPLE EMBODIMENTS

Overview

Techniques are provided for detecting that a camera lens of a video camera has been obscured by an intentional act of a person. Video output of the video camera is terminated in response to detecting that the camera lens has been obscured. There are a variety of applications for these techniques, including terminating the supply of video over a network during a video call or conference session.

Example Embodiments

Figure 1:
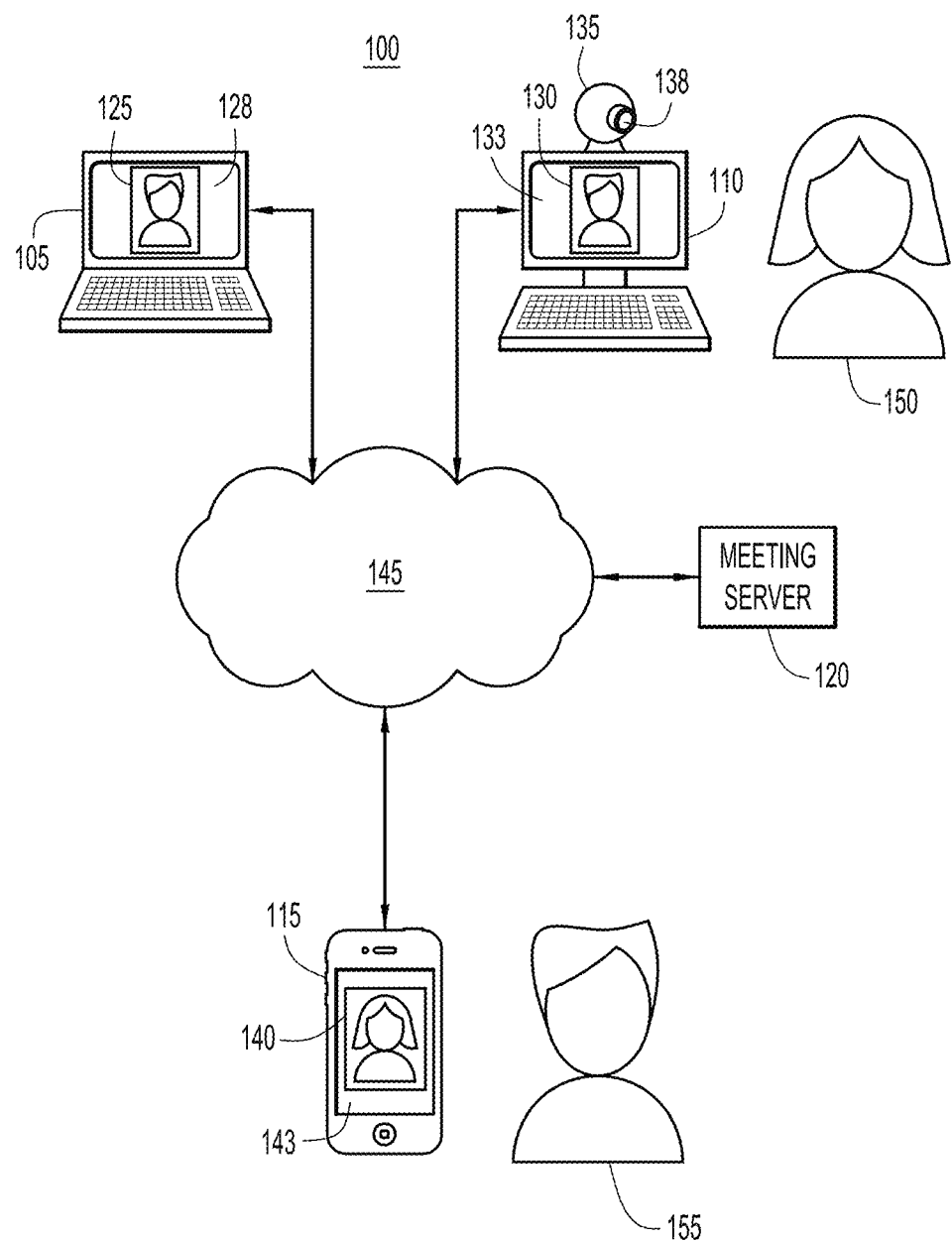
FIG. 1 is a diagram showing a video call system in which devices may display video output from cameras on other devices in the video call according to the techniques presented herein.

Referring first to FIG. 1, a web-based or online meeting/video call system 100 is shown. The system 100 includes a plurality of user devices 105, 110 and 115 that communicate with a meeting server 120 and thus with each other, via the meeting server 120, over a public/private network 145. The user devices may be in any number and may take a variety of forms, including a desktop computer, laptop computer, mobile/cellular phone (e.g., Smartphone), tablet computer, etc. The network 145 may consist of one or more wired and/or wireless local and/or wide area networks.

In the example shown in FIG. 1, user devices 105, 110 and 115 are in a video call/conference with each other. Device 105 has a display 128 which shows a video feed 125. Similarly, device 110 has a display 133 which shows a video feed 130, and device 115 has a display 143 which shows a video feed 140. In a video call, each device 105, 110, and 115 may be video-enabled, allowing each to capture (and optionally record) video and audio data of the associated user and/or device surroundings. This video data is output and made available across network 145, via meeting server 120 (or some other similar intervening entity) to the other devices on the video call. For example, device 110 may be video-enabled, with an attached (or integrated) video camera 135 with lens 138. Video camera 135 produces a video output, such as a view of the user 150 of device 110. This video output would then be sent to device 115 via network 145 (and by way of the meeting server 120 for display on one or both of devices 105 and 115). The video output could then be displayed, for example, on device 115 as shown at 140. Similarly, device 115 may be video-enabled with an attached or built-in video camera, and produces a video output of a view of the user 155 of device 115 to be sent to devices 105 and 110 via network 145 (and meeting server 120) for presentation on display 130. Device 105 may also have an integrated or attached video camera (not shown). In this manner, the users of devices 105, 110 and 115 could have a virtual face-to-face conversation.

Figure 2A:
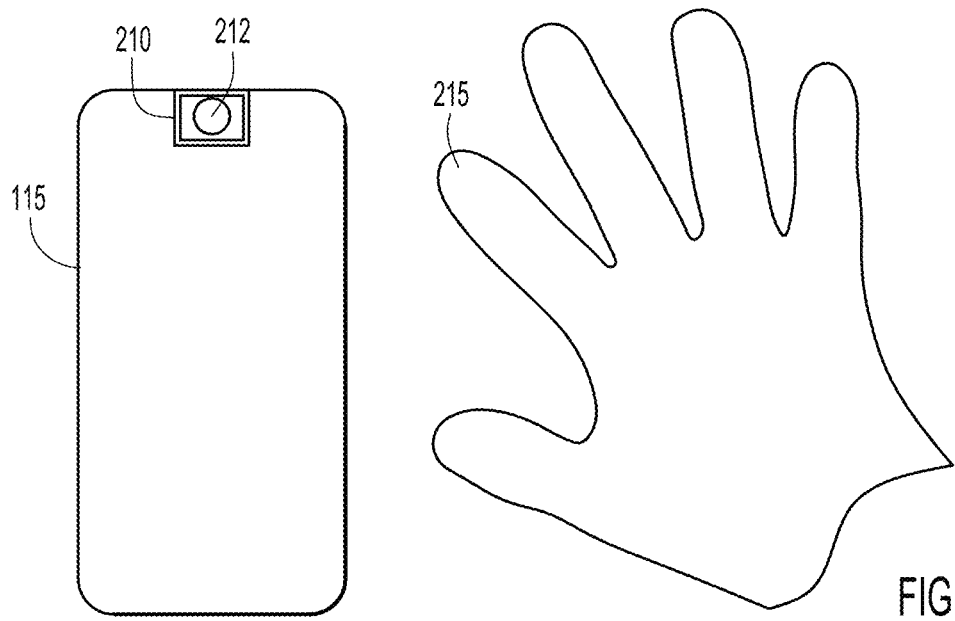
FIG. 2A and 2B are diagrams illustrating a technique for terminating video output on a device with a video camera according to the techniques presented herein.
Figure 2B:
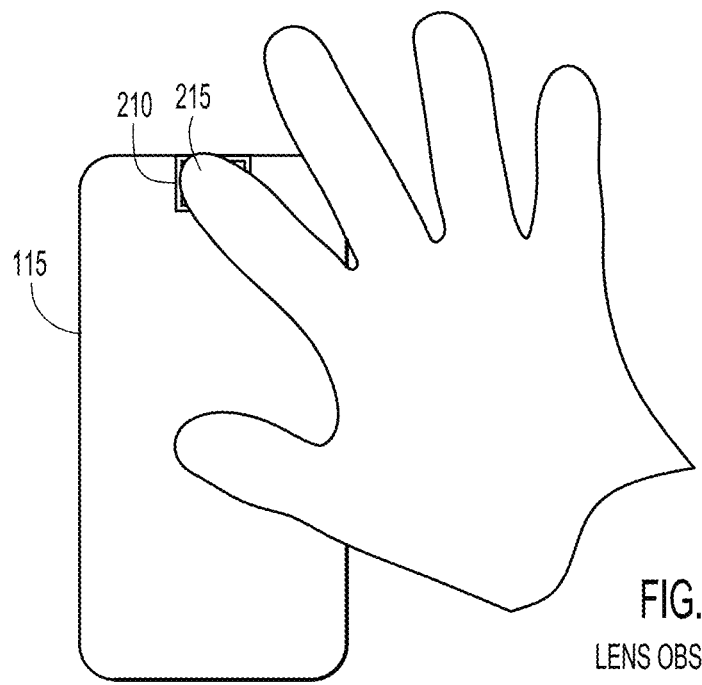

As mentioned previously, the users of devices 105, 110, and 115 may wish to terminate the video output from their own device for various reasons, including concerns related to battery and power consumption, network bandwidth usage, digital storage, concern with their own physical appearance, etc. FIGS. 2A and 2B illustrate a solution according to the techniques presented herein. In this example, device 115 is video-enabled and has a video camera 210 with camera lens 212 to produce video output. Normal use is shown in FIG. 2A in which the video camera 210 captures video of what is in view of lens 212. In accordance with one form of the techniques presented herein, a user places a finger 215 over camera lens 212 such that the camera lens 212 is obstructed as shown in FIG. 2B. When this occurs, the device 115 detects that the camera lens 212 has been obscured (by an intentional act of the user), and responds by automatically terminating the video output of the camera 210. In a video call or conference, video data from the device 115 may thus cease to be collected and forwarded into network 145 in the form of a video stream. Thus, terminating video output may involve disabling a video stream derived from the video output of a video camera, so that the video stream is not transmitted into a network.

Device 115 may have multiple video cameras (e.g., on the front and back), and this technique could be applied to any or all of the video cameras. Similarly, while device 115, which is a small hand-held device is shown in the example of FIGS. 2A and 2A, the technique of FIG. 2B to disable/terminate video output of a video camera may be employed in any video-enabled device, such as desktop computer, laptop computer, mobile/cellular phone (e.g., Smartphone), tablet computer, etc. For example, a user of device 110 could terminate video output from device 135 by obscuring camera lens 138. Software (and/or hardware) in the host device interprets this physical blockage of the camera lens and an intentional act by a user/person to "mute camera" or "stop video feed".

In the example of FIGS. 2A and 2B, a human finger is used to obscure the camera lens and trigger the termination of video output. Any portion of a person's hand could be used to obscure the camera lens and case termination of video output. Moreover, any object obscuring the camera lens could cause the termination of video output. Light levels received via a camera lens (e.g., lens 138 or 212) may be measured to determine that the camera lens has been obscured for at least a predetermined time period. The device may operate to detect when light levels have dropped below a predetermined threshold, which may be user-configurable. For example, a user may be able to set a lumens value as a predetermined threshold such that when light levels are below that threshold (for a predetermined period of time), the video camera output is disabled. Human finger or human hand recognition techniques may also be employed such that accidentally obscuring the camera lens with a non-human object becomes less likely to result in video output termination. Instead of a human hand or finger, the lens may be obscured with an object (piece of paper, tape, etc.) in a similar manner in order to cause the video output to be terminated/disabled. Furthermore, techniques such as video image recognition, human pulse recognition, bioelectrical detection, touchscreen (touch response to the camera lens itself), etc., may be employed to trigger the termination of video output by detection of an appropriate indicator that is construed to be an intentional act to cause video output termination.

This technique could also be applied in the absence of a network 145, and used in disabling a video feed derived from the video output of a camera, rather than disabling the transmission of a video stream across a network. For example, a user may wish to terminate the video portion of a video recording, and this could be done quickly using the techniques presented herein, and the audio recording may (or may not) remain active. Employing the video output termination techniques may be useful in a recording situation in order to reduce or minimize data storage requirements for a recording, or otherwise to terminate a recording section for any reason. As another example, either a user or the device could detect that a data storage used to store recorded video output is running low on available storage space. The device may generate an alert to warn a user of the low data storage. In response, the user could then terminate the video output from the video camera using the techniques presented herein. Further still, terminating a video output may be used to disable a video feed derived from the video output of a video camera to a display, e.g., a local display.

Figure 3:
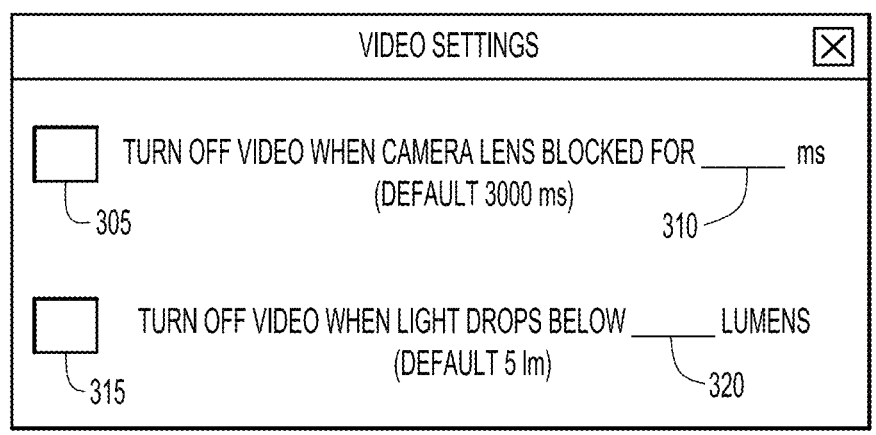
FIG. 3 is a diagram showing user-configurable settings which may be applied for video output termination according to the techniques presented herein.

Reference is now made to FIG. 3 that illustrates an example of a user interface to configure whether the video output termination techniques are invoked, or under what circumstances they are invoked. A user interface screen 300 is shown. In the screen 300, a checkbox 305 is provided to allow a user to select whether or not termination of video output would occur when a camera lens is obscured. Further, a user may adjust a duration of a predetermined time period, specified at 310, that the camera lens would have to be obscured to result in termination of the video output. The user may enter the number of milliseconds, though any unit of time may be used. This functionality may help reduce the likelihood of false positive situations, in which the camera output is terminated, when in fact the user does not want or intend it to be terminated. The user interface also features a light level setting, such as a lumens level or threshold, which triggers the termination of video output as mentioned previously. A user may override a default lumens value by selecting checkbox 315 and specifying at 320 at what light level, such as what average lumens value, would trigger a termination of video output.

Figure 4:
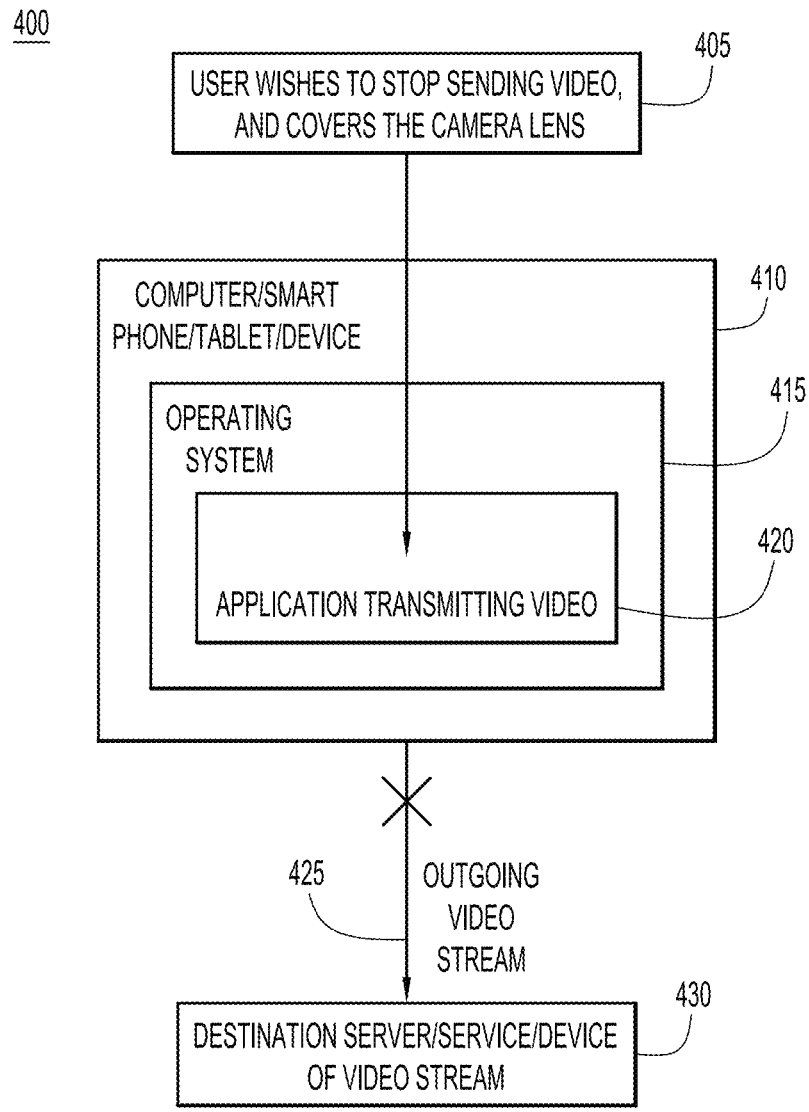
FIG. 4 is a simplified diagram showing system operations performed to terminate video output from a camera on a device.

The techniques presented herein may be implemented in a number of ways, as shown in FIG. 4 by the general operation flow 400. When the user wishes to stop outputting video from the video camera (for example, to stop sending an outgoing video stream 425 to destination server/service/device 430), he/she obscures (covers) a camera lens at 405 according to any of the methods described above. Detection and execution of the video output termination may occur at the device level 410, at the operating system level 415 or at the application level 420, or any combination of these levels/layers. For example, obscuring of the video camera lens may be detected in the operating system 415, which results in a system command to the application 420, which itself terminates the video output. The application 420 that is transmitting or outputting the video from the camera is ultimately responsible for delivering the video camera output to whatever video consumer involved, e.g., to a modem (for transmission into a network), a display (for displaying the video) or a storage unit (for storing the video).

Figure 5:
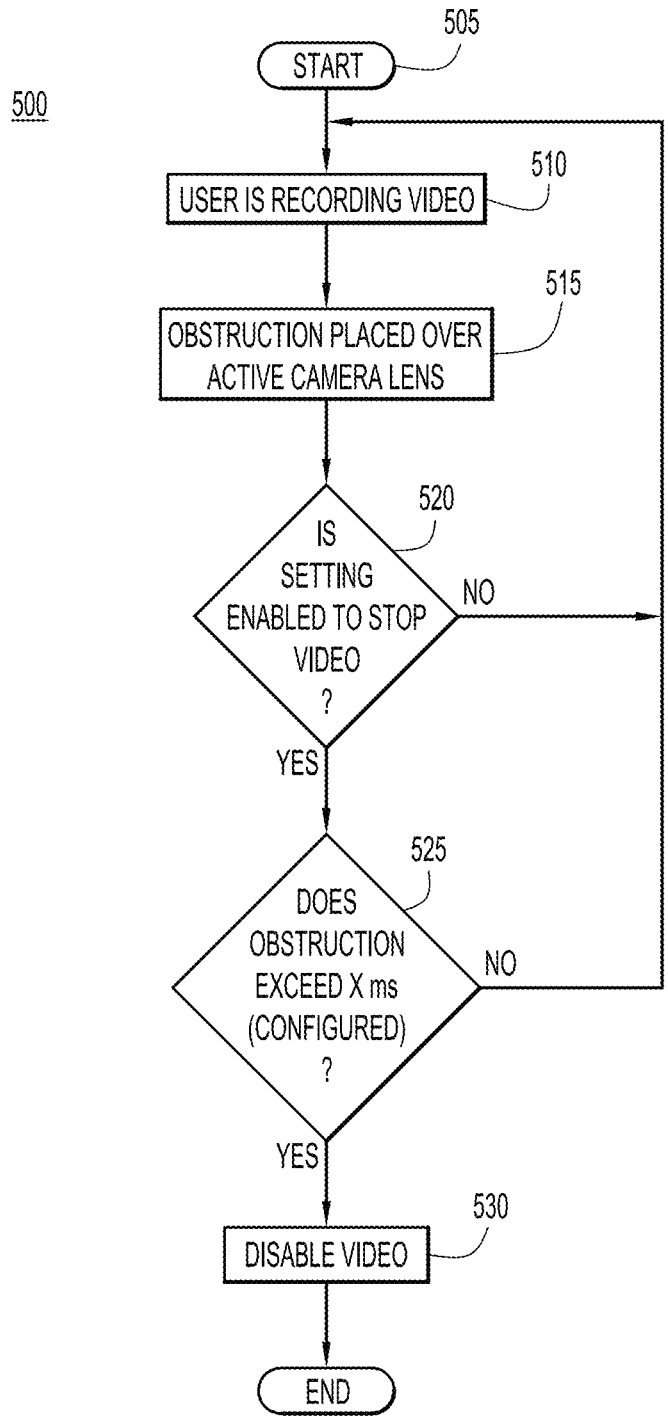
FIG. 5 is a flow chart depicting operations performed by a device according to techniques presented herein.

Turning now to FIG. 5, a flow chart for a process 500 is described. The process starts at 505. At 510, a user may capture, record and/or transmit a video. At 515, the lens is obstructed using any of the techniques described above. At 520, the device that is capturing the video determines whether a setting is enabled to terminate video output in response to detecting an obstruction of the camera lens. If this feature is not enabled, video output continues. If the terminate video output feature is enabled, at 525 the device detects if the obstruction remains for more than a predetermined time period, which may be user-configurable. Operation 525 involves detecting whether the video camera lens is being obstructed by an intentional act of a person, and should therefore be construed as a command to terminate video output from the video camera. Software and/or hardware in the host device analyzes the light levels detected by the video camera over a period of time to make the determination that the obstruction should be construed as an intentional act to terminate or mute the vide output. Operations 520 and 525 may be performed in either order, or in parallel. In addition, at 525, the light levels detected by the camera lens may be compared with respect to a predetermined threshold, as described above in connection with FIG. 3. If the obstruction over the camera lens is less than the predetermined time period, video capture, recording and/or transmitting continues at 510. If the obstruction does exceed the predetermined time period, video output is disabled at 530.

While not specifically shown in FIG. 5, it is to be understood that a similar action that is used to terminate video output may be used to re-enable video output from the video camera. That is, a user may obscure the camera lens again by a finger, hand or object, and this may be construed, when the video output is disabled, to re-enable the video output. Alternatively, a button or user-configurable setting may be provided on the device to re-enable video output. The button may a graphical user interface icon or a physical button on the device or video camera.

Figure 6:
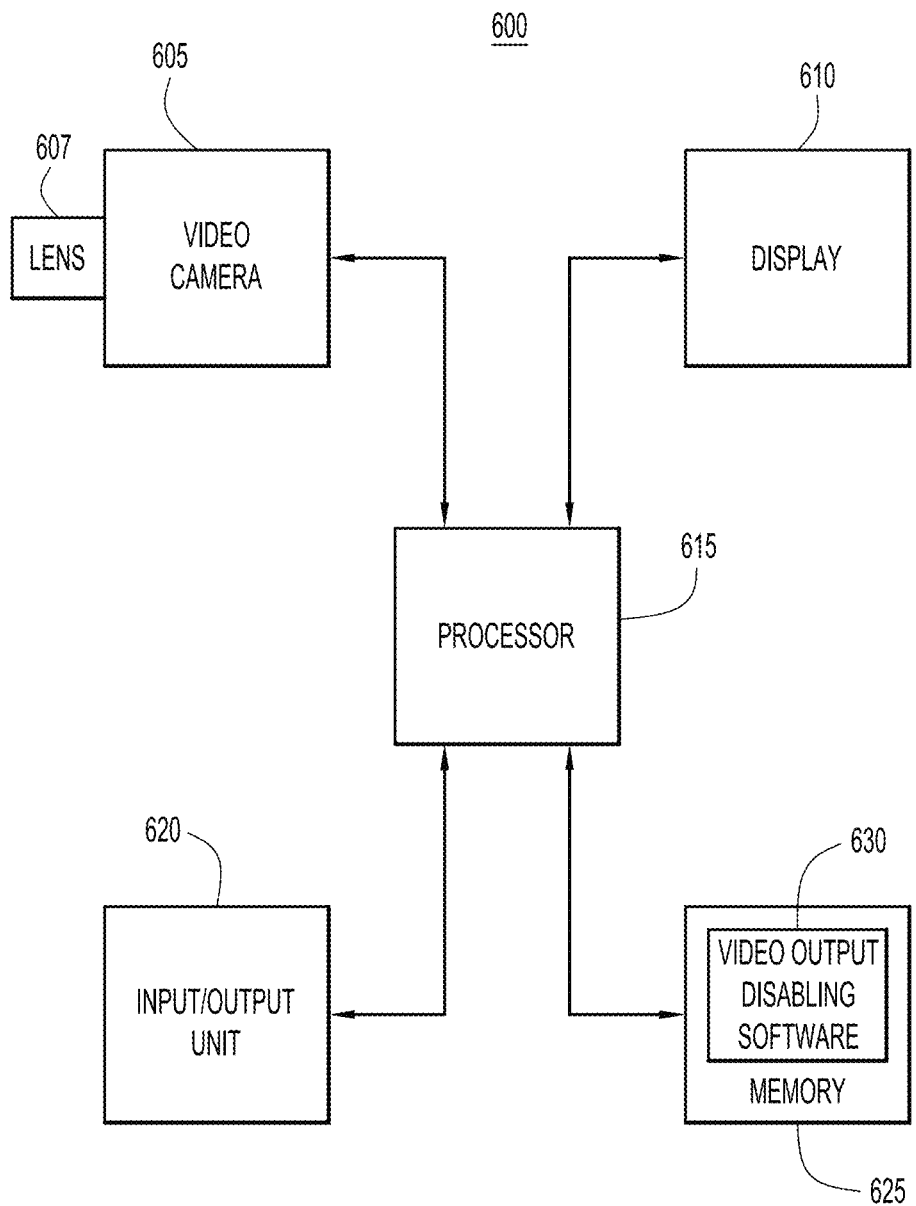
FIG. 6 is an example of a block diagram of a device configured to perform termination of video output according to techniques presented herein.

FIG. 6 shows a simplified block diagram of a device 600 configured to perform the techniques presented herein. The device 600 includes a video camera 605 having a lens 607, a display 610, a processor 615, an input/output unit 620 and memory 625. The video camera 605 captures video in the view of the lens 607. The input/output unit 620 may comprise a wired or wireless network interface unit to enable network communications, including the transmission of video data captured by the video camera 605. The input/output unit 620 may support other input/output capabilities, such as to communicate video to a remote display or monitor, etc.

The processor 615 is, for example, a microprocessor or microcontroller that executes instructions stored in memory 625. Memory 625 may comprise read only memory (ROM), random access memory (RAM), magnetic disk storage media devices, optical storage media devices, flash memory devices, electrical, optical, or other physical/tangible memory storage devices. Memory 625 may store software instructions for video output disabling software 630 which contains instructions that, when executed by the processor 615, cause the processor 615 to perform the techniques presented herein. Thus, in general, the memory 625 may comprise one or more tangible (non-transitory) computer readable storage media (e.g., a memory device) encoded with software comprising computer executable instructions and when the software is executed (by the processor 615) it is operable to perform the operations described herein in connection.

To summarize, presented herein are techniques to allow a person to terminate output of video from a video camera without the need for any dedicated button or special procedure, but in a manner that can be quickly and easily invoked by a user. These techniques allow a user to terminate video output for any of a variety of reasons, including reducing network bandwidth usage, reducing power consumption of the device, preventing unwanted capturing of video for a particular event or scene, etc. These techniques are particularly attractive because they do not require knowledge of device features, etc., and are in that sense somewhat "low-tech" and user friendly. It is not necessary to interpret any particular gestures, or to rely on pressing buttons of various camera/phone hardware. A user simply covers the lens with his/her finger or other physical object (paper, etc.) and the video feed is halted. Again, these techniques are particularly beneficial when using a mobile device with a video camera, and works well for people of all technical skill levels.

In method form, a method is provided comprising: detecting that a camera lens of a video camera has been obscured by an intentional act of a person; and terminating, in response to detecting that the camera lens has been obscured, video output of the video camera.

Similarly, an apparatus is provided comprising: a video camera configured to capture video of a scene in view of a lens of the video camera; and a processor coupled to the video camera, wherein the processor is configured to detect that a camera lens of a video camera has been obscured by an intentional act of a person; and terminate, in response to detecting that the camera lens has been obscured, video output of the video camera.

Further, computer readable storage media is encoded with software comprising computer executable instructions and when the software is executed operable to: detect that a camera lens of a video camera has been obscured by an intentional act of a person; and terminate, in response to detecting that the camera lens has been obscured, video output of the video camera.

The above description is intended by way of example only.

What is claimed is:

1. A method comprising:
    detecting that a camera lens of a video camera has been obscured by an intentional act of a person for a duration of a predetermined time period, wherein the predetermined time period is user configurable; and
    terminating, in response to detecting that the camera lens has been obscured for the duration of the predetermined time period, video output of the video camera.

2. The method of claim 1, wherein terminating comprises:
    disabling a video feed derived from the video output to a display.

3. The method of claim 1, wherein terminating comprises:
    disabling a video stream, derived from the video output, from transmission into network.

4. The method of claim 1, wherein detecting that the camera lens has been obscured comprises:
    detecting that at least a portion of a human hand has been placed over the camera lens.

5. The method of claim 1, wherein detecting that the camera lens has been obscured comprises:
    detecting that light levels received by the camera lens have dropped below a predetermined threshold.

6. The method of claim 1, wherein terminating video output does not occur if the camera lens of the video camera is obscured by an intentional act of a person for less than the duration of the predetermined time period.

7. An apparatus comprising:
    a video camera configured to capture video for a scene in view of a lens of the video camera; and
    a processor coupled to the video camera, and configured to:
        detect that the camera lens of the video camera has been obscured by an intentional act of a person for a duration of a predetermined time period, wherein the predetermined time period is user configurable; and
        terminate, in response to detecting that the camera lens has been obscured for the duration of the predetermined time period, video output of the video camera.

8. The apparatus of claim 7, wherein the processor is configured to terminate video output by:
    disabling a video feed derived from the video output to a display.

9. The apparatus of claim 7, wherein the processor is configured to terminate video output by:
    disabling a video stream, derived from the video output, from transmission into a network.

10. The apparatus of claim 7, wherein the processor is configured to detect that a camera lens has been obscured by:
    detecting that at least a portion of a human hand has been placed over the camera lens.

11. The apparatus of claim 7, wherein the processor is configured to detect that a camera lens has been obscured by:
    detecting that light levels received by the camera lens have dropped below a predetermined threshold.

12. The apparatus of claim 7, wherein the processor is configured to not terminate video output if the camera lens of the video camera is obscured by an intentional act of a person for less than the duration of the predetermined time period.

13. One or more computer readable non-transitory storage media encoded with software comprising computer executable instructions and when the software is executed operable to:
    detect that a camera lens of a video camera has been obscured by an intentional act of a person for a duration of a predetermined time period, wherein the predetermined time period is user configurable; and
    terminate, in response to detecting that the camera lens has been obscured for the duration of the predetermined time period, video output of the video camera.

14. The computer readable non-transitory storage media of claim 13, wherein instructions operable to terminate comprises instructions operable to disable a video feed derived from the video output to a display.

15. The computer readable non-transitory storage media of claim 13, wherein instructions operable to terminate comprises instructions operable to disable a video stream, derived from the video output, from transmission across a network.

16. The computer readable non-transitory storage media of claim 13, wherein instructions operable to detect that a camera lens has been obscured comprises instructions operable to detect that at least a portion of a human hand has been placed over the camera lens.

17. The computer readable non-transitory storage media of claim 13, wherein instructions operable to detect that a camera lens has been obscured comprises instructions operable to detect that light levels received by the camera lens have dropped below a predetermined threshold.

18. The computer readable non-transitory storage media of claim 13, wherein instructions operable to terminate video output does not occur if the camera lens of the video camera is obscured by an intentional act of a person for less than the duration of a predetermined time period.

\* \* \* \* \*